Nov. 14, 1939. H. R. MINOR 2,180,304
APPARATUS FOR MOLDING SPONGE RUBBER
Filed Dec. 1, 1937 2 Sheets-Sheet 1
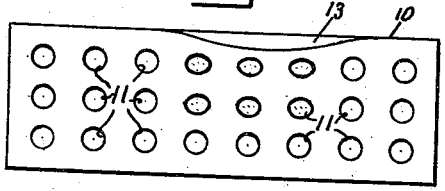
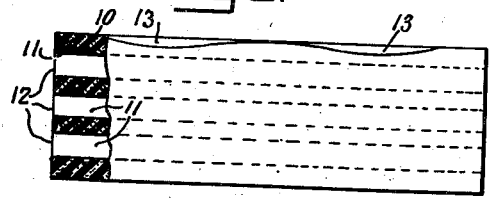
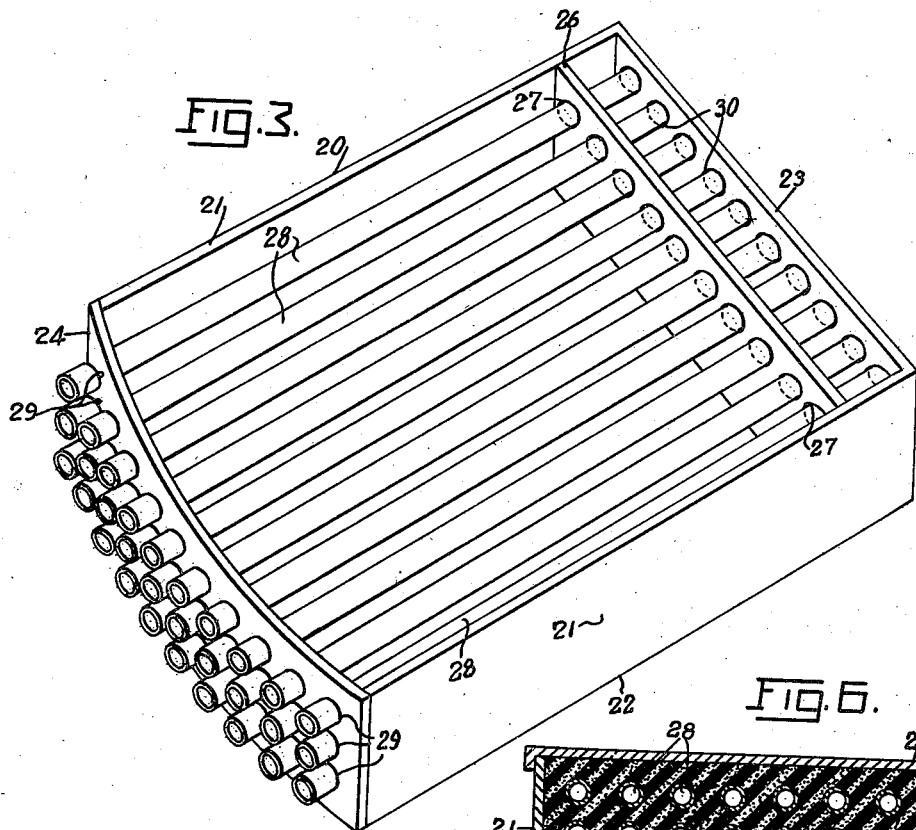
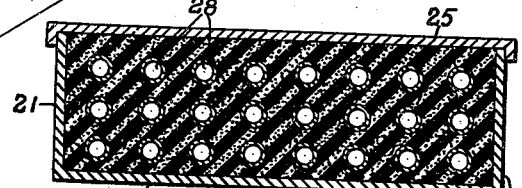
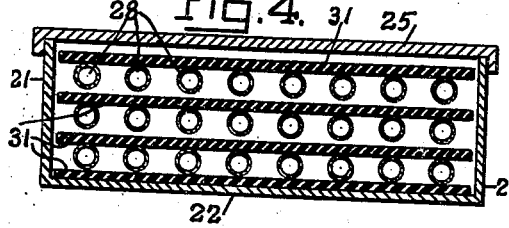
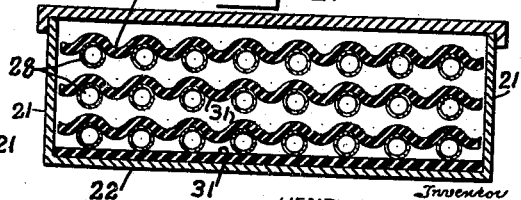
Inventor
HENRY R. MINOR,
By Toulmin & Toulmin
Attorneys Nov. 14, 1939.                H. R. MINOR                2,180,304
                    APPARATUS FOR MOLDING SPONGE RUBBER
                    Filed Dec. 1, 1937        2 Sheets-Sheet 2
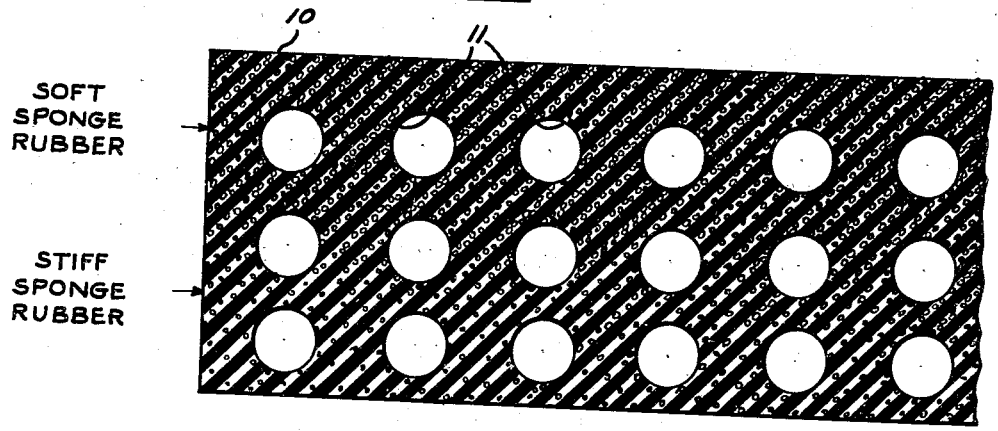
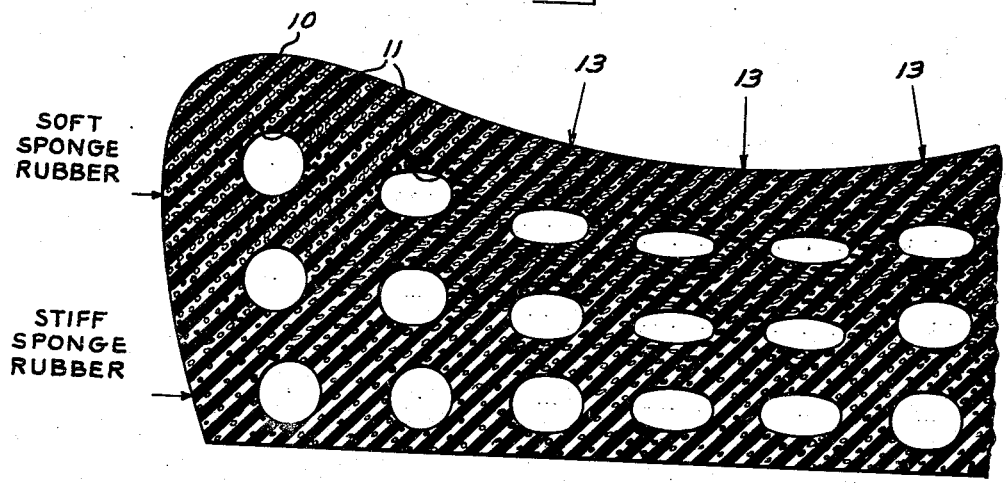
INVENTOR
HENRY R. MINOR
ATTORNEYS Patented Nov. 14, 1939

2,180,304

UNITED STATES PATENT OFFICE 2,180,304

APPARATUS FOR MOLDING SPONGE RUBBER

Henry R. Minor, Dayton, Ohio, assignor to Industrial Process Corp., Dayton, Ohio, a corporation of New York Application December 1, 1937, Serial No. 177,649

3 Claims. (Cl. 18—34)

This invention relates to apparatus for molding rubber articles, and in particular, to apparatus for molding sponge rubber articles.

One object of this invention is to provide a molding apparatus for producing sponge rubber articles having elongated cavities or apertures therein.

Another object is to provide a molding apparatus for molding sponge rubber articles, wherein means is provided for supporting successive layers of sponge rubber batch in spaced positions so that when the assembly is heated the batch layers will soften and expand around the supports to form a sponge rubber body with elongated apertures therein.

Another object is to provide a molding apparatus for molding sponge rubber articles consisting in a mold having removable supports for supporting a plurality of rods or pipes upon which layers of rubber batch may be placed, whereupon the heating of the assembly causes the layers of rubber batch to expand and unite with one another around the supports, thereby forming a sponge rubber body with tubular apertures or passageways therethrough after the supports are removed from the apparatus.

In the drawings:

Figure 1 is a side elevation of a sponge rubber body, such as a cushion, produced in the molding apparatus of this invention.

Figure 2 is a front elevation, partly broken away, of the sponge rubber body shown in Figure 1.

Figure 3 is a perspective view of the molding apparatus of this invention, with the under layers or pipes removed to simplify the showing, but with the ends of the removed pipes shown emerging from the side wall of the apparatus.

Figure 4 is a cross sectional view of the apparatus shown in Figure 3, with the sponge rubber batch layers in position at the start of the molding operations.

Figure 5 is a view similar to Figure 4, but showing the drooping of the sponge rubber batch layers shortly after the commencement of the molding operations.

Figure 6 is a view similar to Figures 4 and 5, but showing the appearance of the completed sponge rubber article in the molding apparatus after the molding operations have been terminated.

Referring to the drawings in detail, Figure 1 shows a sponge rubber cushion, generally designated 10, having a multiplicity of tubular passageways 11 therethrough. These tubular passageways are preferably parallel to one another and also preferably have the ends 12 of the passageways 11 open to the atmosphere. The advantage of this construction is that when a heavy body depresses the cushion, as at 13, the sponge rubber portion of the cushion not only will yield in its usual manner, but the passageways 11 will become distorted or flattened and expel some of the air therefrom, and increase the resilience of the cushion. The cushion of Figures 1 and 2 is not necessarily homogeneous, but may have different characteristics in different layers, as hereinafter set forth in more detail. The outer portions, for example, may have different densities or porosities than the inner portions. In this manner the surface portions of the cushion 10 may be given characteristics for improving the appearance of the article, as well as for providing a suitable surface for the application of trademarks, identifying data or designs.

A preferred apparatus for making the cushion of Figures 1 and 2 is shown in Figure 3, and consists of a molding apparatus, generally designated 20, having relatively thin side walls 21, a bottom wall 22 and end walls 23 and 24. The walls 21 to 24, inclusive, are preferably of thin sheet metal, the provision of a top 25 being optional. The showing of the molding apparatus 20 is diagrammatic in the several views. Arranged within the molding apparatus 20 is a partition 26 having a plurality of apertures 27 for the admission and support of rods or pipes 28. For purposes of simplification only the top layer of rods or pipes is shown within the apparatus 20, the mid-portions thereof being broken off immediately after passing through the end wall 24. Similar apertures 29 are provided in the end wall 24. The apertures 27 and 29 are slightly larger than the rods or tubes 28 so as to provide a loose, sliding fit therebetween. Preferably also the end wall 23 is provided with apertures 30 for the passage of the outer ends of the rods or pipes 28.

The end wall 24 is removable from the apparatus so that the pipes 28 may be temporarily supported solely by the partition 26 cooperating with the end wall 23. In this manner the successive layers of sponge rubber batch may be conveniently inserted before the end wall 24 is placed in position. The ends of the pipes 28 may be beveled, if desired, to facilitate their admission to and passage through the various apertures 27, 29 and 30. The pipes 28 are preferably of metal with a plated coating, tending to render them non-adhesive to the rubber, such a plated coating as chromium, cadmium or the like being found suitable for this purpose. The pipes may optionally be coated with talc, or other suitable substance, reducing the sticking of the sponge rubber to the pipes.

By providing the partition 27 the pipes 28 may be centered and supported so that it is unnecessary to thrust the pipes through the assembly of layers of rubber stock. This construction eliminates the scraping of the coating of the pipes, or the marring of the pipe surfaces, and enables the rubber batch layers to be placed in position, one layer at a time, followed by a layer of pipes, then another layer of rubber batch, etc. until the molding apparatus 20 has been filled. This prevention of the marring of the pipes keeps their surfaces in perfect condition, and facilitates the withdrawal of the pipes from the rubber article after the manufacturing process has been completed.

In the method of making the rubber article shown in Figures 1 and 2, a layer 31 of suitable sponge rubber stock is placed upon the bottom 22 of the molding apparatus 20, with the end wall 24 thereof removed. The lowermost layer of the pipes 28 is then inserted, the pipes being caused to pass through the apertures 27 and 30, and thereby to be supported at one end. A second layer 31 of rubber batch is then laid upon the first layer of pipes 28, after which a second layer of pipes 28 is inserted in the same manner. This procedure is repeated until the desired number of alternate layers of pipes 28 and rubber batch layers 31 have been provided. The removable end 24 is then placed in position, with the ends of the pipes 28 passing through the apertures 29 therein. The top 25, if used, is then placed in position and the assembly placed in an autoclave and subjected to the usual processes of heating and expanding the rubber.

As the rubber is heated during the early part of the procedure, it droops and assumes the position shown in Figure 5. The different batch layers 31 thus present, in cross section, an undulating appearance excepting, of course, bottom layer 31, which is supported by the bottom wall 22 of the molding apparatus 20. When the heating and expansion have been carried still further, the successive batch layers expand into engagement with one another, thereby filling the spaces between the pipes 28, and presenting the cross sectional appearance shown in Figure 6. By this method of using alternate layers of rubber batch and pipes, it is possible to obtain a sponge rubber article of any thickness desired, yet with a substantially constant density throughout, a problem which has hitherto presented great difficulties in the sponge rubber art. By varying the characteristics of the different layers 31 it is also obviously possible to vary the density or porosity of the resulting article 10. It is further possible to apply layers having different color characteristics, or different surface characteristics for the application of identifying data, trade marks or designs. When the expansion and heating have been completed, the rods or pipes 28 may be removed by withdrawing them axially from the sponge rubber article 10, and the latter removed from the molding apparatus 20. The designs or trade marks may be slightly embossed in the surface by placing a thin layer thereof on top of the uppermost layer 31, and permitting the design or color layer to unite with the other layers by the usual heating and vulcanizing procedure.

It will be understood that I desire to comprehend within my invention such modifications as come within the scope of the claims and the invention.

Having thus fully described my invention, what I claim as new and desire to secure by Letters Patent, is:

1. In an apparatus for molding rubber articles comprising integral layers, a container having a removable wall, spaced apertures in said removable wall corresponding to spaced apertures in the wall opposite said removable wall, horizontally disposed supports inserted in said apertures for supporting rubber stack layers in superimposed spaced relationship, an additional member arranged between said apertured walls, and means on said additional member for holding said supports in spaced positions during the removal of said removable wall.

2. In an apparatus for molding rubber articles, a frame having a pair of spaced support-holding members, elongated horizontally disposed supports for supporting layers of rubber stock, an additional support-holding member arranged intermediate said previously mentioned support-holding members, and means on said support-retaining members for removably holding said supports in spaced positions during the removal of one of said pair of spaced support holding members.

3. In an apparatus for molding rubber articles, a frame having a pair of spaced support-holding members, elongated supports retained by said spaced members for supporting layers of rubber stock in a horizontal position, an additional support-holding member arranged intermediate said previously mentioned support-holding members, and means on said support-holding members for removably holding said supports, one of said support-holding members being removable whereby to permit said intermediate support-holding member and the other member to maintain said supports in their spaced positions to facilitate the insertion of rubber stock layers on said supports.

HENRY R. MINOR.